United States Patent [19]

Pushee et al.

[11] 4,392,804
[45] Jul. 12, 1983

[54] SOLID STATING

[75] Inventors: Joan C. Pushee, Amherst; Ieuan L. Harry, Nashua; Martin H. Beck, Brookline; Suppayan M. Krishnakumar, Nashua, all of N.H.

[73] Assignee: The Continental Group, Inc., Stamford, Conn.

[21] Appl. No.: 299,283

[22] Filed: Sep. 4, 1981

[51] Int. Cl.³ .............................................. B29B 3/00
[52] U.S. Cl. .............................. 425/174.8 E; 422/138; 422/186; 425/203
[58] Field of Search ......... 425/174.8 E, 203, 174.8 R; 264/26; 422/138, 186

[56] References Cited

U.S. PATENT DOCUMENTS

| | | | |
|---|---|---|---|
| 2,695,427 | 11/1954 | Sarge et al. | 264/26 |
| 2,966,469 | 12/1960 | Smythe et al. | 264/26 |
| 3,253,303 | 5/1966 | Bradt | 425/203 |
| 3,410,938 | 11/1968 | Schippers | 425/203 |

Primary Examiner—Thomas P. Pavelko
Attorney, Agent, or Firm—Charles E. Brown

[57] ABSTRACT

This relates to the increasing of the intrinsic viscosity of resins, particularly PET, by effecting a solid state polymerization of the resin. More particularly, the solid stating is effected in conjunction with an injection or extrusion unit wherein after having the IV of the resin increased, the heated resin may be fed dry into an injection unit thereby utilizing the heat of the heated resin to reduce heating cost. The solid state polymerization is effected by heating the resin in the presence of either a vacuum or an inert gas such as nitrogen.

15 Claims, 2 Drawing Figures

SOLID STATING

This invention relates to new and useful improvements in the forming of articles from plastics material, and more particularly to the increasing of the intrinsic viscosity of polyethylene terephthalate (PET).

PET resin may be obtained in different grades with the intrinsic viscosity (IV) varying and increasing in the higher grade PET. The higher the IV, the greater the orientation properties of the resin as well as the purity of the resin. In a like manner, the cost of the resin increases.

Further, in substantially all manufacturing processes there is a scrap which is reground and which is recycled with new resin in the production of articles. It has been found that the scrap, which of course must be heated to a melt phase to effect the injection or extrusion thereof, has a material reduction in IV.

In the manufacture of PET bottles, it is a requirement that high orientation be obtained, particularly in the hoop direction, so that the bottle will have the necessary strength while permitting the use of a minimum amount of resin. Accordingly, the IV of the resin may be critical.

It has been found that PET particles, pellets and regrinds may have the IV thereof increased by effecting solid stating of the PET. It further has been found to be highly beneficial to effect such solid stating in conjunction with an injection molding process.

In accordance with this invention, solid stating is effected by heating the PET resin to effect polymerization in the presence of either a high vacuum or an inert gas such as nitrogen with the vacuum or nitrogen bath being operative to remove the product of condensation polymerization. The solid state polymerization causes a chain growth while effecting the removal of such undesired impurities as diol acids, oligomers and aldehyde residuals used in or produced during the melt phase polymerization of the resin.

It has been found that when PET particles are heated at a temperature on the order of 180° C. (172°–185° C.) and higher to a temperature on the order of 230° C., with the heated polymer being subjected to a gaseous flow to effect the removal of the gaseous products of condensation polymerization to maintain the IV, the IV of PET polymer may be materially raised. Thus it is feasible to purchase lower grade PET resin. More particularly, solid stating of the PET resin permits an efficient use of the reground scrap.

A material advantage can be obtained by effecting solid stating of the PET resin in conjunction with an injection molding process. At the present, the PET must be heated to remove water which may be as much as 0.45% by weight and requires 3 hours at 350° F. in addition to 1 SCFM air flow. By incorporating the solid stating operation in line with the supplying of dry PET resin to an injection unit, the cost of effecting the solid stating is reduced by the usual cost of drying the PET resin. Further, by incorporating the solid stating in conjunction with a supplying of the resin to the injection unit, the higher temperature of the resin may be used to reduce the heat load of the injection unit.

While the heating may be effected by means of any type of commercial heater, when the resin is heated by normal heating means the heating is from the exterior inwardly, and it has been found that a more efficient heating operation may be effected by using RF heating means wherein the heating of the resin is generally more even throughout the chip.

It has also been found that RF heating may be beneficially utilized in heating the required amount of PET resin in the short time available as provided by the polymer demand of the injection unit.

With the above and other objects in view that will hereinafter appear, the nature of the invention will be more clearly understood by reference to the following detailed description, the appended claims, and the several views illustrated in the accompanying drawings.

IN THE DRAWINGS

Figure 1:
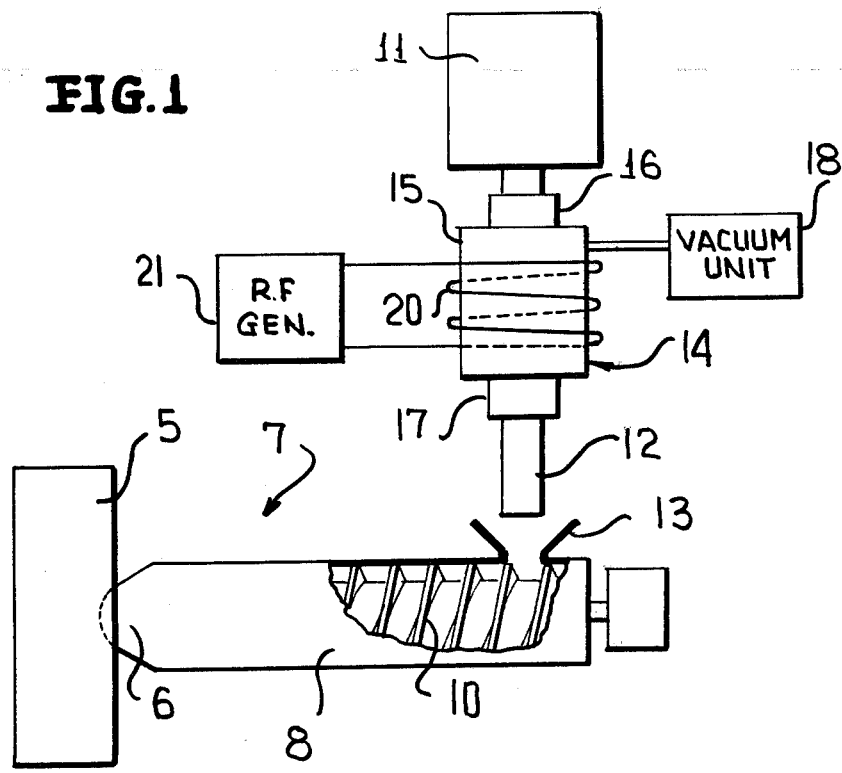
FIG. 1 is a schematic view of an injection molding unit having incorporated in the supply line to the injection unit a solid stating unit in accordance with this invention.

Referring now to the drawings in detail, it will be seen that there is illustrated a conventional injection molding system having incorporated therein a solid stating apparatus in accordance with this invention. The injection molding system includes an injection mold 5 to which there is connected a nozzle 6 of a screw type injection unit 7 including a barrel 8 and a screw 10. Resin in pellet or chip form is provided from a supply 11 through a supply line 12 to an inlet 13 of the extrusion unit 7. In accordance with this invention there is mounted within the supply line 12 for treating all resin delivered from the supply 11 to the extruder barrel 8 a solid stating apparatus 14 for increasing the IV of the resin passing therethrough. Most particularly, in accordance with this invention the resin will normally be PET and the preferred usage of the injection molding apparatus will be to effect the injection molding of preforms from which beverage bottles, particularly those to be utilized with a carbonated beverage, are blow molded.

The solid staging apparatus 14 includes a suitable housing 15 defining a chamber in which the resin is temporarily stored in an isolated condition. To effect a sealed condition within the chamber defined by the housing 15, the supply line 12 is provided with a supply valve unit 16 at the entrance end of the housing 15 and a delivery valve unit 17 at the exit end of the housing 15. The specifics of the valve units 16 and 17 are not set forth here in that they will be readily available commercial items and normally will be in the form of rotary gates so as to seal the interior of the housing 15 from the supply 11 on the one hand and the injection unit on the other hand.

In accordance with this invention, the resin that is momentarily within the housing 15 will be heated to a solid stating polymerization temperature which may be on the order of 180° C. but which may be as high as 230° C. In actual test operations, an attempt has been made to maintain the temperature of PET polymer within the housing 15 on the order of 180° C., although actually the temperature may vary between 172° C. to 185° C. More effective and faster polymerization may be effected with higher temperatures although the upper limit will be on the order of 230° C.

It has also been found that the products of condensation polymerization must be removed in order to drive the reaction. If it is not, the IV of the heated product may actually be lower than the starting IV. In practice, it has been found that the desired gaseous flow to effect the reaction products to be removed may be in the form of a high vacuum, i.e. a vacuum of 0.5 mm of mercury or better, with suitable vacuums being on the order of 0.1 to 0.5 mm of mercury.

It has also been found that removal of the products of combustion may also be effected by flushing the heated resins with an inert gas, particularly nitrogen.

With reference to FIG. 1, it will be seen that a vacuum unit 18 is connected to the housing 15 for exhausting gases therefrom.

Further, the heating apparatus has been simply illustrated as being in the form of an electrical coil 20 surrounding the housing 15 and coupled to an RF generator 21, although plate electrode either within or outside of the housing may be preferred.

Figure 2:
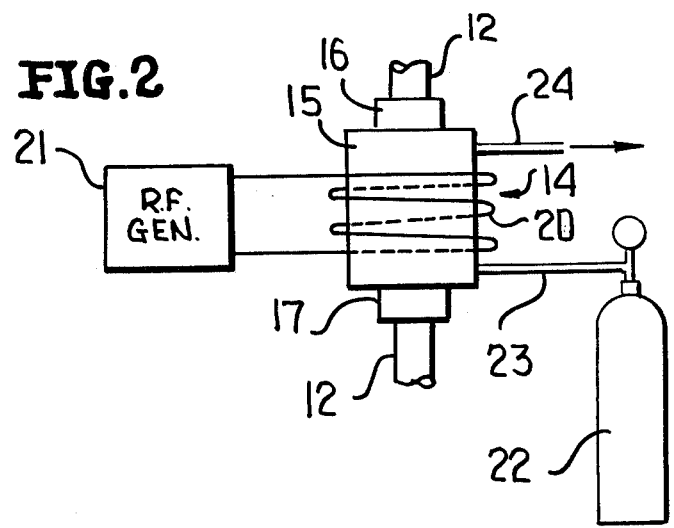
FIG. 2 is a fragmentary schematic view showing the use of a modified form of gaseous flow unit.

In the embodiment of FIG. 2, the means for drawing a vacuum in the housing 15 has been replaced with an inert gas supply which includes a suitable supply unit 22 which is illustrated as a bottle and which gas supply 22 is coupled to the housing 15 by means of a supply line 23 connected to the housing at one end thereof. The housing 15 is also provided with an exhaust line 24 which is illustrated as being open to the atmosphere but which may be coupled to some type of purifying assembly to remove impurities (not shown), and then recycled through the resin bed.

By uniformly heating a chip or pellet, a substantially constant IV can be obtained throughout the chip as compared to a non-uniform IV when the chip is convexed or induction heated. Assuming the chip to be in the shape of a cube for descriptive purposes only, it will be seen that the corners of the chip will have a maximum exposed surface to volume ratio and thus will be heated to a higher temperature than the remainder of the chip. The next highest temperature will be bound along the edges of the chip between the corners. The remainder of the external surface of the chip will then have the higher temperature, with the temperature of the chip progressively diminishing toward the center of the chip. It could well be that the IV of the chip is even unchanged at its center with conventional heating. However, the RF heating the temperature of the chip will be substantially uniform throughout, and therefore the solid stating should be uniformly effected with the IV of the chip to be uniform throughout.

While to date only a limited experimentation has taken place, the experimentations have been sufficient clearly to indicate that a reasonable expectation of beneficial results beyond the scope of the tests may be expected.

In the tests run to date, the following beneficial results have been obtained with small samples of resin heated to a temperature on the average of 180° C. under high vacuum on the order of less than 0.5 mm of mercury with the following results:

| SOLID STATING SMALL SAMPLES AT 180° C. UNDER HIGH VACUUM | | | | | | |
|---|---|---|---|---|---|---|
| Sample Source | Size in mm | No. of samples in oven | Hours in oven | Initial IV (DL/G) | Final IV (DL/G) | Change IV |
| Fines from preform regrind | Powder | 1 | 24 | .752 | 1.474 | +.767 |
| Fines from preform regrind | " | 2 | 6 | .757 | .971 | +.214 |
| Fines from preform regrind | " | 2 | 3 | .757 | .837 | +.080 |
| Zimmer pellets | 3 × 2 × 1 | 4 samples for 4 hrs. then 2 samples for 2 hrs. | 6 | .708 | .845 | +.137 |
| Zimmer pellets | " | 4 | 4 | .708 | .776 | +.068 |
| Goodyear as pellets - 5877 | 3 × 3 × 4 | 2 | 6 | .738 | .805 | +.067 |
| pellets - 5877 | " | 2 | 3 | .738 | .746 | +.008 |
| pellets - 6151 | " | 3 | 6½ | .850 | .905 | +.055 |
| pellets - 6151 | " | 3 | 6 | .905 | .939 | +.034 |
| Goodyear CP pellets 5877 | 3 × 3 × 2 | 4 samples for 4 hrs. then 2 samples for 2 hrs. | 6 | .718 | .798 | +.080 |
| pellets - 5877 | " | 4 | 4 | .718 | .765 | +.047 |
| pellets - 6151 | " | 3 | 6½ | .885 | .980 | +.095 |
| pellets - 6151 | " | 3 | 6 | .980 | 1.044 | +.064 |
| Re-extruded bottle regrind | Various | 3 | 6½ | .692 | .794 | +.102 |
| Preform regrind | Various | 3 | 6 | .841 | 1.033 | +.192 |

Although only preferred embodiments and samples in accordance with this invention have been set forth hereinabove, it is to be understood that minor variations may be made in the solid stating method and apparatus without departing from the spirit and scope of the invention as defined in the appended claims.

We claim:

1. An injection molding system comprising a particulate PET supply source, an extruder, and an injection mold, a supply line between said supply source and said extruder, a housing defining a chamber in which the particulate resin is temporarily stored in isolated condition along said supply line, and means associated with said chamber for effecting solid stating of particulate PET flowing in said housing to raise the intrinsic viscosity of the particulate resin in advance of particulate resin flow from said chamber to said extruder.

2. An injection molding system according to claim 1 wherein said means for effecting solid stating includes heater means for heating PET particles to a solid stating reaction temperature, and gaseous flow means for effecting the removal of products of condensation polymerization.

3. An injection molding system according to claim 2 wherein said heater means is operative to heat PET particles to an average temperature on the order of 180° C.

4. An injection molding system according to claim 2 wherein said heater means is operative to heat PET particles to an average temperature on the order of 180° C. with said temperature ranging from 172° C. to 185° C.

5. An injection molding system according to claim 2 wherein said heater means is operative to heat PET particles to a temperature ranging from 172° C. to 230° C.

6. An injection molding system according to claim 2 wherein said heater means is RF heater means.

7. An injection molding system according to claim 2 wherein said gaseous flow means are vacuum producing means.

8. An injection molding system according to claim 2 wherein said gaseous flow means are vacuum producing means providing a vacuum on the order of 0.1 mm of mercury.

9. An injection molding system according to claim 2 wherein said gaseous flow means is inert gas flow means.

10. An injection molding system according to claim 2 wherein said gaseous flow means is nitrogen flow means.

11. An injection molding system according to claim 1 wherein said means for effecting solid stating includes a chamber, and flow control valve means at opposite ends of said chamber for delivering PET particles to said chamber at a level of intrinsic viscosity and delivering PET particles from said chamber at an increased level of intrinsic viscosity.

12. Apparatus for increasing the intrinsic viscosity of PET, said apparatus comprising a particulate PET supply source, a receptacle for receiving particulate PET having an increased intrinsic viscosity, a supply line between said supply source and said receptacle, a housing defining a chamber for receiving and temporarily storing PET particles, heater means for heating the temporarily stored PET particles in isolated relation along said supply line within said chamber to effect a solid stating reaction of the PET particles flowing in said chamber to raise the intrinsic viscosity of the particulate PET before the PET particles are discharged from said chamber into said receptacle, and gaseous flow means connected to said chamber for removing the products of condensation polymerization.

13. Apparatus according to claim 12 wherein said heater means is RF heater means.

14. Apparatus according to claim 12 wherein said gaseous flow means are vacuum producing means.

15. Apparatus according to claim 12 wherein said gaseous flow means is nitrogen flow means.

* * * * *